3,513,136
POLYMERIZATION OF MALEIC ANHYDRIDE
John H. Blumbergs, Highland Park, and Donald G. Mac-Kellar, Trenton, N.J., assignors to FMC Corporation, New York, N.Y., a corporation of Delaware
No Drawing. Filed Sept. 10, 1968, Ser. No. 758,678
Int. Cl. C08f 1/60, 3/48
U.S. Cl. 260—78.4
4 Claims

ABSTRACT OF THE DISCLOSURE

Maleic anhydride is homopolymerized by heating said maleic anhydride at a temperature of at least about 65° C. in the presence of an initiating amount of a mixed maleic-acyl peroxide.

BACKGROUND OF THE INVENTION

Field of the invention

This invention relates to homopolymers of maleic anhydride and particularly with a method for initiating the formation of such homopolymers.

Description of the prior art

It is know that maleic anhydride can be homopolymerized to form polymers having a molecular weight in the range of from about 300 to as high as 100,000 with the most common molecular weight ranging from about 3,500 to about 7,000. These homopolymers of maleic anhydride or derivatives thereof, e.g., polymerized maleic acid and the water-soluble salts thereof, have been reported to be effective as builders in detergent formulations, as additives to other polymer systems, as textile treating agents and for use in the surface treatment of metals.

One process for producing these homoploymers of maleic anhydride and derivatives thereof is set forth in U.S. Pat. 3,359,246, issued to Jim S. Berry on Dec. 19, 1967. In this patent the poly(maleic anhydride) is produced by homopolymerizing maleic anhydride using acetyl peroxide as the polymerization initiator. Under these conditions, a homopolymer of maleic anhydride is obtained in yields up to 90%. Other workers in the field have described the polymerization of maleic anhydride using high pressures as reported by S. D. Hamann in Austr. J. Chem., 1967, 20, pp. 605–9. In all of these publications it is well recognized that the homopolymerization of maleic anhydride is difficult to initiate and that special polymerization techniques are required to obtain satisfactory results.

The use of acetyl peroxide as the polymerization initiator, as described in the above U.S. Pat. 3,359,246, has serious drawbacks. Initially, acetyl peroxide is shock sensitive and can be detonated by rough handling or dropping of the acetyl peroxide compound. This is a serious drawback because it means that one of the essential ingredients must be handled with great care to avoid detonating the shock-sensitive acetyl peroxide. Another drawback is that acetyl peroxide, at present, is commercially available only as a solution in dimethyl phthalate. The dimethyl phthalate solvent accordingly must be added along with the acetyl peroxide to the maleic anhydride compound, and the dimethyl phthalate contaminates the final product. To remove the dimethyl phthalate, an expensive organic solvent procedure is required to isolate the product from the dimethyl phthalate.

While this is of no moment in the small scale laboratory preparation of poly(maleic anhydride), it poses a major problem to commercial utilization of this process. In a plant operation, the dimethyl phthalate solvent must be separated from the acetyl peroxide or from the final poly(maleic anhydride) product. Other known procedures for initiating homopolymerization of the maleic anhydride also have serious disadvantages. For example, the use of high pressures to initiate polymerization of the maleic anhydride is not desired in a commercial operation, since it would require specialized, costly equipment built to withstand the high pressures necessary to initiate the polymerization reaction. This specialized, expensive equipment would increase materially the capital cost of operating such a process. As a result, the art is in need of a more simplified, workable method for homopolymerizing maleic anhydride without hazardous compounds.

OBJECTS OF THE INVENTION

It is an object of the present invention to initiate the homopolymerization of maleic anhydride by a method which readily converts the maleic anhydride to poly(maleic anhydride) in high yields.

It is a further object to initiate the homopolymerization of maleic anhydride by carrying out the polymerization in the presence of an initiator which is not detonable and therefore permits a completely safe operation.

It is still a further object of the present invention to initiate the homopolymerization of maleic anhydride by means of an initiator which can be operated under ambient pressures and under mild conditions without requiring the use of superatmospheric, pressurized vessels.

These and other objects will be apparent from the foregoing disclosure.

SUMMARY OF THE INVENTION

We have now found that maleic anhydride can be homopolymerized by heating said maleic anhydride to a temperature of at least about 65° C. in the presence of an initiating amount of a mixed maleic-acyl peroxide, having the structure:

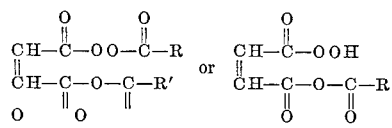

where R or R' may be an aliphatic or cycloaliphatic group containing up to 6 carbon atoms, or a phenyl group, and R' may be the same group as R.

DESCRIPTION OF THE INVENTION AND THE PREFERRED EMBODIMENTS

In carrying out the present invention, the mixed maleic-acyl peroxide initiator is first prepared. A preferred method for preparing these mixed maleic-acyl peroxides is as follows. Maleic anhydride is first melted at 65° C. either in the presence of a solvent or in the absence of one. Hydrogen peroxide is then added to the melted maleic anhydride. The peroxide immediately reacts with the maleic anhydride to form permaleic acid in substantially quantitative yields. This reaction is set forth in the equation below:

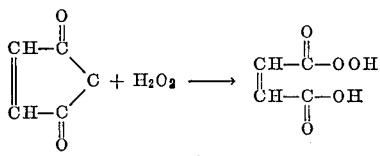

To the permaleic acid is then added an acylating agent, normally a carboxylic acid anhydride. The anhydride in turn reacts with the permaleic acid to form a mixed maleic-acyl peroxide. A typical reaction using acetic anhydride as the acylating agent is set forth below:

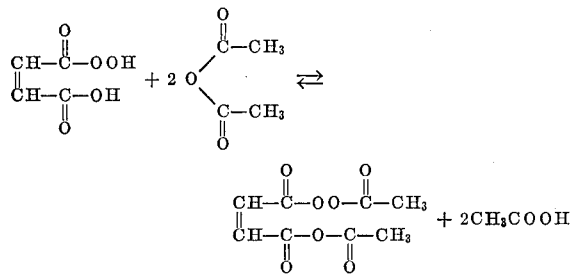

The acylation agent may be a carboxylic acid anhydride, such as acetic anhydride, benzoic acid anhydride, propionic acid anhydride, hexanoic acid anhydride and cyclohexane carboxylic acid anhydrides. Ketene can also be used as an acylating agent.

When using one mole of ketene per mole of permaleic acid, a monoacetylated product is obtained, which serves as the initiator for homopolymerization of maleic anhydride. This reaction is shown below:

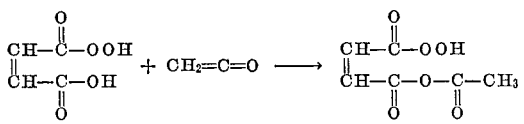

Two moles of ketone will give a diacetylated product as shown below:

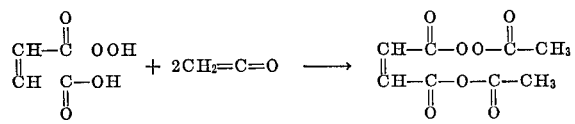

The carboxylic acid anhydrides useful as acylating agents may be symmetrical, as shown above, or they may be unsymmetrical, i.e., mixed carboxylic acid anhydrides. These include formyl-acetic anhydride, benzoyl-acetic anhydride, propionyl-acetic anhydride and cyclohexane carbonyl-acetic anhydride.

The acyl residue of the above-described maleic-acyl peroxides may be either unsubstituted or substituted with groups such as halogens, $NO_2$, $C \equiv N$ or methoxy or ethoxy groups. These may include maleic-trifluoro-acetic, maleic-trichloroacetic, maleic-monochloro-acetic, maleic-p-nitrobenzoic, maleic-cyanobenzoic and maleic-methoxybenzoic peroxides. Additionally, phenyl residues likewise can be substituted with lower aliphatic groups having from 1–6 carbon atoms, e.g., isopropyl benzoyl-acetic anhydride.

In carrying out the polymerization procedure, the maleic anhydride is melted at 65° C. in the presence of the above-defined, mixed maleic-acyl peroxide and the reaction permitted to take place at a temperature between 65° and 95° C. Since the reaction is exothermic at least during the initial reaction period, heat exchange means should be used to maintain the temperature within the desired limits. Usually, polymerization is completed within 4 to 6 hours.

The polymerization can take place by the so-called "Neat" polymerization in which only the maleic anhydride and the mixed maleic-acyl peroxide are reacted together without a solvent; alternately, the reaction can be carried out in the presence of a suitable solvent which is non-reactive with the peroxide initiators, maleic anhydride, or the final polymerized product. Among the suitable solvents are benzene, chlorobenzene, o-dichlorobenzene, alkyl acetates such as butylacetate, isopropyl acetate and the like. The solvent should have a boiling point of at least about 70° C.

In carrying out the present polymerization reaction, the mixed maleic-acyl peroxide must be present in initiating amounts. Normally, amounts as low as about 2% by weight of the mixed maleic-acyl peroxide, based on the weight of the maleic anhydride present, are sufficient to initiate the reaction. However, larger amounts may be used, and, in fact, are desirable to assure the ready initiation of the polymaleic anhydride polymerization reaction. Obviously, the exact initiating amount of the mixed maleic-acyl peroxide will vary, depending upon the acyl group which is employed in making up the peroxide.

A procedure of the present invention is to add the desired amount of maleic anhydride for reaction to a vessel, with or without a solvent, heat it to at least 65° C. and subsequently add hydrogen peroxide in amounts sufficient to react with a portion of the maleic anhydride. Normally, the amount of hydrogen peroxide used is at least about 0.5% by weight of the maleic anhydride starting material. Obviously, higher amounts of hydrogen peroxide can also be employed. The added hydrogen peroxide then reacts with a stoichiometric amount of maleic anhydride to form permaleic acid without affecting the remaining maleic anhydride. The resulting permaleic acid which is formed does not act as a polymerization initiator per se, nor does it react in any fashion with the remaining maleic anhydride. At least a stoichiometric amount of an acylating agent is then added to the maleic anhydride. The acylating agent reacts with the permaleic acid to form the mixed maleic-acyl peroxide. Thereafter, the mixed maleic-acyl peroxide commences initiating the homopolymerization of the maleic anhydride at temperatures of 65° C. and above.

Normally, a slight excess of acylating agent can be employed over the stoichiometric amount necessary to react with the permaleic acid in order to assure obtaining high yields of the mixed maleic-acyl peroxide compound which acts as the initiator.

The resulting poly(maleic anhydride) may have a molecular weight ranging anywhere from 500 to 50,000. However, the product obtained by the present polymerization reaction normally yields a molecular weight ranging from about 3,000 to as high as 7,000.

Purification of the resulting poly(maleic anhydride) is easily accomplished by distilling the resulting product under reduced pressure to remove volatiles. Among the volatiles removed are the acyl acid corresponding to the acylating agent employed in producing the mixed maleic acyl peroxide in the presence of the maleic anhydride. The resulting poly(maleic anhydride) produced by the invention is readily soluble in non-reactive solvents such as water, acetone, tetrahydrofuran, 1,2-dimethoxyethane, alkyl acetates, methylethyl ketone, dioxane and others.

When the poly(maleic anhydride) is dissolved in water, it converts to the poly(maleic acid). Metallic salts of the resulting poly(maleic acid) can be produced by well-known acid-salt conversion reactions. One simple method for producing such salts is carried out by dissolving the poly(maleic anhydride) in water at about 100° C., neutralizing the resulting aqueous poly(maleic acid) with an alkali solution, e.g., NaOH, up to a pH of 10.0; the resulting solution is heated for a period of 3 to 4 hours. Upon readjusting the pH to about 10.0, a solid alkali metal (sodium polymaleate) is obtained and can be recovered by stripping off the water.

EXAMPLE 1

Run A—Process of the invention

In a one-liter, three-neck reaction flask, supplied with a laboratory stirrer and condenser, there was placed 650 g. of maleic anhydride. The flask was heated on a hot water bath to a temperature of 65° C. until all the maleic anhydride had melted. The stirrer was then started and 7.0 g. of 90% hydrogen peroxide was added dropwise over a period of 5 minutes. The reaction mixture was maintained at 65–75° C. for an additional 10 minutes, and then 100 g. of acetic anhydride was added. Shortly thereafter, a polymerization reaction began which was exothermic, and a cold water bath was used surrounding the reaction flask to maintain the temperature of the reaction mixture at 75–95° C. After reacting the mixture for about 2 hours, the rate of polymerization decreased, and hot water had to be added to the bath to maintain the temperature of the reaction mixture at 75–95° C. for an additional 2–3 hours until the polymerization was complete. Thereafter, the reaction flask was connected to a vacuum system and the major portion of the byproduct acetic acid was removed by distillation under reduced pressure. Distillation was discontinued when the reaction mixture turned very viscous. The crude viscous product was then dissolved in approximately 2 liters of hot water. The addition of water to the maleic anhydride polymer hydrolyzes the anhydride groups to poly(maleic acid). The subsequent mixture was placed in a flask and the water stripped off under reduced pressure to yield 693 g. of crude polymaleic acid. The yield was 90% theoretical, based on the maleic anhydride feed.

Run B—Process in which the acyl anhydride is omitted

The same procedure was repeated as set forth in Run A, except that the 100 g. of acetic anhydride was omitted. After maintaining the reaction mixture for 6 hours at 75–95° C., no polymerization was obtained. About 95% of the maleic anhydride starting reagent was recovered unreacted.

This example demonstrates the inability of permaleic acid, formed by reaction of the added hydrogen peroxide and a portion of the maleic anhydride, to initiate polymerization of the maleic anhydride.

EXAMPLE 2

The process of Example 1, Run A, was repeated except that 150 g. of propionic acid anhydride was used in place of the 100 g. of acetic anhydride. The yield of poly(maleic acid) was 87% of theory based on the maleic anhydride feed.

EXAMPLE 3

The process of Example 1, Run A, wa srepeated except that 150 g. of benzoic anhydride was used in place of the 100 g. of acetic anhydride. The yield of poly(maleic acid) was 72% of theory based on the maleic anhydride feed.

EXAMPLE 4

The process of Example 1, Run A, was repeated except that 150 g. of cyclohexane carboxylic acid anhydride was used in place of the 100 g. of acetic anhydride. The yield of poly(maleic acid) was 74% of theory based on the maleic anhydride feed.

EXAMPLE 5

The process of Example 1, Run A, was repeated except that 150 g. of trichloroacetic anhydride was used in place of the 100 g. acetic anhydride. The yield of poly(maleic acid) was 92% of theory based on the maleic anhydride feed.

EXAMPLE 6

The process of Example 1, Run A, was repeated except that 100 g. of trifluoroacetic anhydride was used in place of the 100 g. of acetic anhydride. In this run, the temperature of the mixture was maintained at 60–65° C. during the first 15 minutes after addition of the trifluoroacetic anhydride. This anhydride, having a boiling point of 42° C., commenced to boil and condense in the condenser and reflux back into the flask during the start of the reaction. After all of the anhydride reacted, no condensate formed in the condenser. Thereafter, the temperature of the reaction mixture was raised to 75–95° C. After 6 hours of reaction, the yield of poly(maleic acid) recovered, based on the maleic anhydride reagent, was 91% of theory.

EXAMPLE 7

Run A—Process of the invention using ketene

A one-liter, three-neck reaction flask, supplied with a laboratory stirrer and condenser, similar to that used in Example 1 was charged with 650 g. of maleic anhydride. The flask was heataed in a hot water bath until the temperature of the maleic anhydride was about 65° C. and had completely melted. The stirrer was then activated, and 7.0 g. of 90% $H_2O_2$ was added. The reaction mixture was maintained at 65–75° C. for an additional 10 minutes, and 16 g. of ketene gas was then added to the vessel. The ketene gas was produced by pyrolysis of acetone as described in detail in J. Org. Chem. 5, 122 (1940). The ketene gas was introduced through a 6 mm. glass inlet tube at a flow rate of 0.01 mole/minute for 38 minutes. Nitrogen was bubbled through the reaction mixture to remove methane gas from the flask which is produced as a byproduct during the pyrolysis of the acetone. The reaction mixture was then maintained at 75–95° C. for 5 hours. The product was isolated in the same manner as has been set forth in Example 1, and 680 g. of crude poly(maleic acid) was recovered. The yield was 88.4% of theoretical, based on the maleic anhydride feed.

Run B—Process of the invention using ketene

The process of Run A was repeated, except that 8.0 g. of ketene was used instead of 16 g. The polymerization proceeded smoothly, giving 88% yield of poly(maleic acid), based on the maleic anhydride feed.

Run C—Process in which ketene was omitted

The process of Run A was repeated, except that the ketene was omitted. No polymerization took place. Approximately 95% of the maleic anhydride starting material was recovered unreacted. The in-situ-produced permaleic acid did not initiate polymerization of the polymaleic anhydride.

EXAMPLE 8

Several mixed carboxylic acid anhydrides were prepared by reacting the corresponding carboxylic acids with ketene as described in detail by R. E. Dunbar and F. C. Garven in Journal of American Chemical Society, 77, pp. 4161–2, 1955.

The mixed carboxylic-acetic anhydrides were added in place of the acetic anhydride as the acylating agent following the procedure set forth in Example 1, Run A. The results are listed in Table I.

TABLE I

| Mixed anhydride acylating agent | Grams used | Grams poly-(maleic acid) obtained | Percent yield |
|---|---|---|---|
| Benzoic-acetic | 150 | 620 | 80.5 |
| Formic-acetic | 100 | 605 | 78.7 |
| Trichloroacetic-acetic | 150 | 696 | 90.4 |
| m-Chlorobenzoic-acetic | 150 | 676 | 87.8 |
| Cyclohexylcarboxylic-acetic | 150 | 610 | 79.2 |

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims,

What is claimed is:

1. Process for homopolymerizing maleic anhydride which comprises heating said maleic anhydride to a temperature of at least about 65° C. in the presence of an initiating amount of a mixed maleic-acyl peroxide, selected from the class of compounds having the structure:

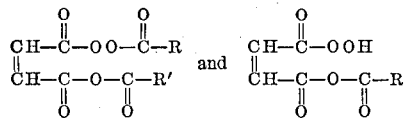

where R and R' are selected from the group consisting of aliphatic groups and cycloaliphatic groups containing up to 6 carbon atoms and a phenyl group.

2. Process of claim 1 in which the maleic anhydride is homopolymerized at temperatures of from about 65–95° C. in the presence of at least about 2% by weight of said mixed maleic-acyl peroxide.

3. Process of homopolymerizing maleic anhydride which comprises melting a maleic anhydride at a temperature of at last about 65° C., adding to said maleic anhydride from about 0.5 to 2% by weight of hydrogen peroxide, thereafter adding a member selected from the group consisting of ketene and an acyl anhydride corresponding to the mixed maleic-acyl peroxide desired, forming a mixed maleic-acyl peroxide, and continuing to heat the remainder of the maleic anhydride in the presence of said maleic-acyl peroxide at a temperature of from about 65 to about 95° C. to form poly(maleic anhydride).

4. Process of claim 3 wherein said poly(maleic anhydride) is reacted with water to form poly(maleic acid).

References Cited

UNITED STATES PATENTS

| | | | |
|---|---|---|---|
| 3,186,972 | 6/1965 | Lang et al. | 260—78.4 |
| 3,359,246 | 12/1967 | Berry | 260—78.4 |
| 3,457,240 | 7/1969 | Heuck et al. | 260—78.4 |

JOSEPH L. SCHOFER, Primary Examiner

J. KIGHT, Assistant Examiner

U.S. Cl. X.R.

252—415, 434